United States Patent [19]

Steed et al.

[11] Patent Number: 4,796,322
[45] Date of Patent: Jan. 10, 1989

[54] REAR DUMPING LAWN SWEEPER WITH FOLDING WIND APRON

[75] Inventors: Jeffrey A. Steed, Union City, Ind.; Walter F. Ruhl; James M. Weaver, both of Greenville, Ohio

[73] Assignee: Lambert Corporation, Ansonia, Ohio

[21] Appl. No.: 176,906

[22] Filed: Apr. 4, 1988

[51] Int. Cl.[4] .............................................. E01H 1/04
[52] U.S. Cl. ...................................... 15/79 A; 15/83; 56/16.6; 56/DIG. 12
[58] Field of Search ................. 15/79 R, 79 A, 83–86; 56/204, 344, DIG. 12, 16.6

[56] References Cited

U.S. PATENT DOCUMENTS 1,229,127 6/1917 Osborne ................................. 15/83
2,964,896 12/1960 Finocchiaro .......................... 15/83
3,493,987 2/1970 Longnecker ......................... 15/83

Primary Examiner—Edward L. Roberts
Attorney, Agent, or Firm—Biebel, French & Nauman

[57] ABSTRACT

A rear dumping brush-type lawn sweeper for attachment to a garden tractor includes a hamper assembly which is mounted on a support frame for pivotal movement. The support frame is carried on the main frame of the brush housing. The hamper assembly carries an open top hamper bag. The top of the bag is normally closed by a mesh-type folding wind apron. A forward portion of the apron is attached to the hamper assembly, while a rear portion of the apron is attached to a rear cross member forming part of the hamper support frame. The wind apron, at its rear terminal end, forms a closure with the rear lip of the hamper bag in the normal running position. When the hamper is rotated rearwardly on the support frame for dumping, the wind screen folds on itself and exposes a rear dumping opening with the rear hamper bag lip.

3 Claims, 3 Drawing Sheets

REAR DUMPING LAWN SWEEPER WITH FOLDING WIND APRON

BACKGROUND OF THE INVENTION

This application relates to lawn sweepers, and more particularly to a power driven or tractor driven sweeper with a rear dumping hamper and a folding wind apron on the hamper.

Power-driven or PTO driven brush-type lawn sweepers with hampers for catching the lawn clippings have been proposed. In one commercial embodiment, the weight of the brush mechanism, the hamper and material therein is carried by a transverse roller located behind the brush. The hamper is arranged to dump forwardly into the limited space between the power-driven brush and the front edge of the hamper, with the result that the operator must afterward drive over the freshly dumped material to move on.

A ground-wheel powered brush-type lawn sweeper having a rear dumping hamper is shown in the U.S. Pat. of Ruhl 3,597,786 issued Aug. 10, 1971 and assigned to the same assignee as this application. While this sweeper was provided with a draw bar and hitch for attachment to the hitch pin of a lawn tractor, it was not power driven and therefor operated satisfactorily without a wind apron over the open-top hamper. The weight of the hamper and material in the hamper was carried on a pair of ground-engaging casters at the rear of the hamper support frame.

There exists a need for a brush-type PTO driven rear dumping lawn sweeper, in which the weight of the brush assembly and the hamper is carried on a transverse lawn roller. Such a unit is desirable for picking up heavy and/or wet clippings from behind the mower. The roller is desirable for "shading" or "striping" the lawn, for appearance.

SUMMARY OF THE INVENTION

The invention is directed to a power-driven brush type lawn sweeper which is particularly adapted to pick up grass clippings and the like, which clippings may be damp or wet, to collect the clippings into a hamper, and then dump the clippings rearwardly of the hamper in such a manner that the operator may drive away with an empty hamper without disturbing the dumped material. The invention employs a wind apron over the open top of the hamper to control the flow of clippings from the power driven brush to assure that they fall into the hamper. The wind apron normally forms a closure with an elevated hamper back hamper lip, but automatically forms a rear-dumping opening with the lip, during the dumping maneuver.

The wind apron is attached at its forward end to a hamper supporting frame, and forms, with a lower forward hamper lip, a transverse opening through which clippings are propelled from the brush assembly into the interior of the hamper and under the wind apron. The hamper itself is carried on a sub-frame or cage between the hamper support frame members on which it is rotatably carried. It may be dumped by rearward rotation, by the pull of a dumping cable from the tractor seat, or by the lifting of the front of the hamper by a handle alongside the hamper.

The weight of the brush assembly and the hamper is carried on an adjustable transverse roller, behind the rotating brush. The roller reforms the brushed grass tops and causes them to lay in the direction of travel, thereby providing a desirable striped effect to the finished lawn.

It is therefor an object of the invention to provide a power-driven brush-type lawn sweeper adapted as a tractor attachment, which carries a rear dumping hamper.

A further object of the invention is the provision of a rear dumping brush-type lawn sweeper having a wind apron which normally covers an open hamper top, and in which one edge of the apron normally forms a closure to a dumping lip of the hamper.

Another object of the invention is the provision of a rear dumping sweeper, of the type described above, in which a rear hamper lip cooperates with a wind apron normally attached to the hamper support frame, for closing the hamper interior during normal operation, and for forming a rear dumping opening when the hamper is rotated on the support frame.

These and other objects and advantages of the invention will be apparent from the following description, the accompanying drawings, and the appended claims.

DESCRIPTION OF THE PREFERRED EMBODIMENT

Figure 1:
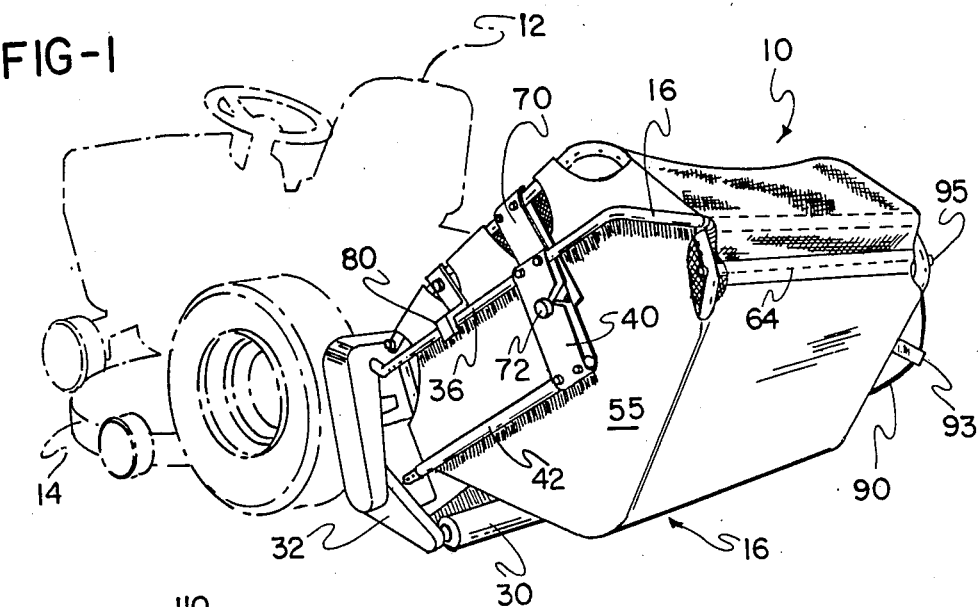
FIG. 1 is a rear perspective view of the power-driven rotating brush-type lawn sweeper of this invention.
Figure 2:
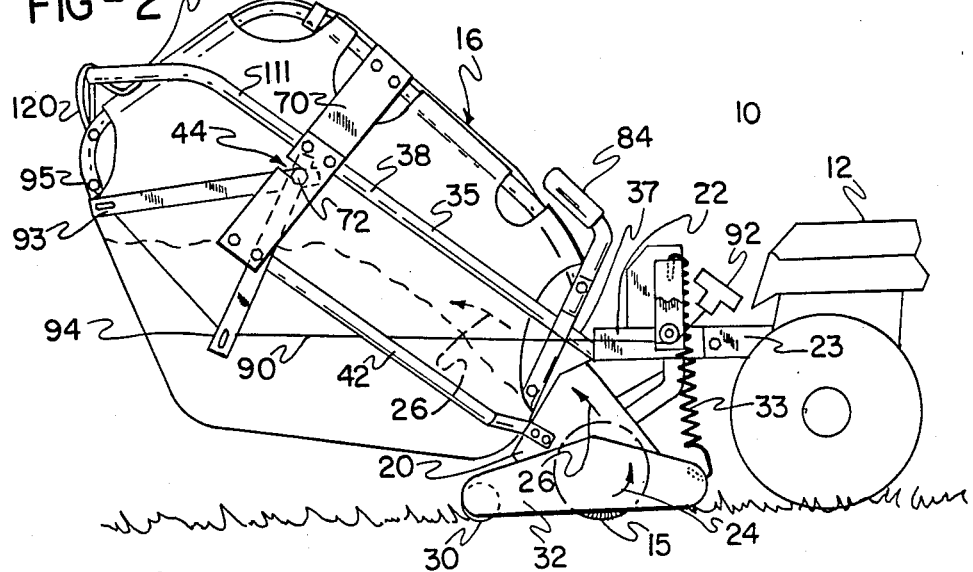
FIG. 2 is a side elevational view of the lawn sweeper.

Referring to the figures of the drawing, which illustrate a preferred embodiment of the invention, an improved power-driven, rotating brush-type lawn sweeper is illustrated generally at 10 in FIGS. 1 and 2. The lawn sweeper 10 is tractor driven and is adapted for attachment behind a lawn tractor 12 illustrated in phantom in FIG. 1 and in fragmentary view in FIG. 2. The lawn tractor 12 may include a conventional cutting deck 14 by means of which the lawn grass is cut, forming clippings lying on the surface of the grass. The brush-type sweeper of this invention picks up these clippings by means of a power driven brush 15 and directs the same into an enclosed hamper assembly 16.

Figure 8:
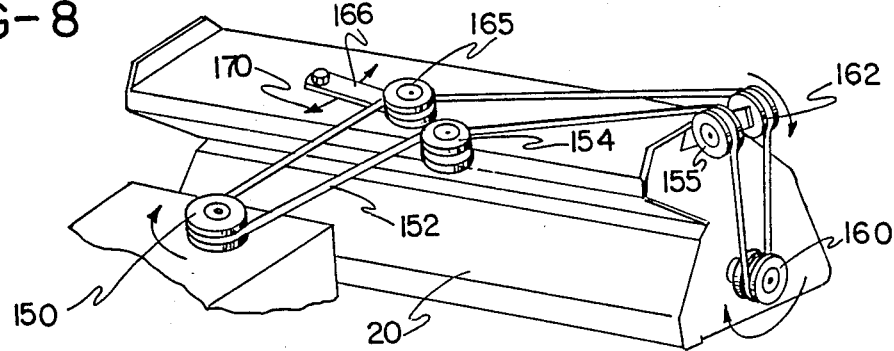
FIG. 8 is a fragmentary perspective view showing the belt and pulley arrangement for carrying power from a PTO pulley on the tractor to the brush.

The brush 15 is rotatably received in a transversely oriented brush housing 20 which forms the main of the sweeper. The housing 20 includes a hitch illustrated generally at 22 in FIG. 2 by means of which the brush housing 20 is connected to a pair of rearwardly extending draw bars 23 (one shown in FIG. 2) of the lawn tractor 12. The brush 15 is rotatably mounted within the housing 20 and is power driven, such as by the PTO arrangement as shown in FIG. 8, in a counterclockwise sense as viewed in FIG. 2, and as illustrated by the arrow 24, to pick up and drive lawn debris, such as lawn clippings, into the interior of the hamper assembly 16 as illustrated by the arrows 26.

The brush housing 20 is open at the bottom to expose the bottom bristles of the brush 15, as illustrated in FIG. 2. The housing 20 is carried on a transversely oriented ground-engaging roller 30. The roller 30 is carried on a pair of arms 32, one each positioned at each end of the housing 20. The arms are counter-balanced by tension springs 33 (FIG. 2). The brush supporting arms 32 are conventionally adjustable to elevate or lower the roller 30 with respect to the axis of the brush 15 for the purpose of adjusting the height of the brush above the surface of the lawn. As perhaps best shown in FIG. 3, the brush housing 20 is open at the rear to discharge the lawn debris, such as lawn clippings, carried by the brush 15 upwardly and rearwardly as illustrated by the arrows 26 into the interior of the hamper assembly 16.

The hamper assembly 16 is rotatably mounted on a support frame, by means of which the weight is transferred to and carried on the housing 20. The support frame for the hamper assembly includes a pair of transversely spaced-apart, tubular, load-carrying side frame members 35 and 36. The side members each have forward ends 37, rigidly attached to the housing 20 and rear ends 38 attached to the upper end of a pivot plate 40. The hamper support frames are completed by lower parallel support members 42 which extend from a rear position at the pivot plate 40 forwardly to a forward position for attachment to the side wall 43 (FIG. 3) of the housing 20. The hamper support frames thus consist of upper tubes 35 or 36 which extend rearwardly from the housing 20, hinge plates 40, and lower tubes 42 which extend forward from the hinge plate 40 back to the housing 20, to form rigid spaced-apart hamper support structures. The bearing plates 40 have bearing means in the form of slots 44 at the rear ends of the frames for rotatably supporting a hamper in the space between the side frame members. The load of the hamper assembly 16 is transferred by the frame members to the brush housing 20 and through the brush housing 20 to the ground-engaging roller 30.

Figure 4:
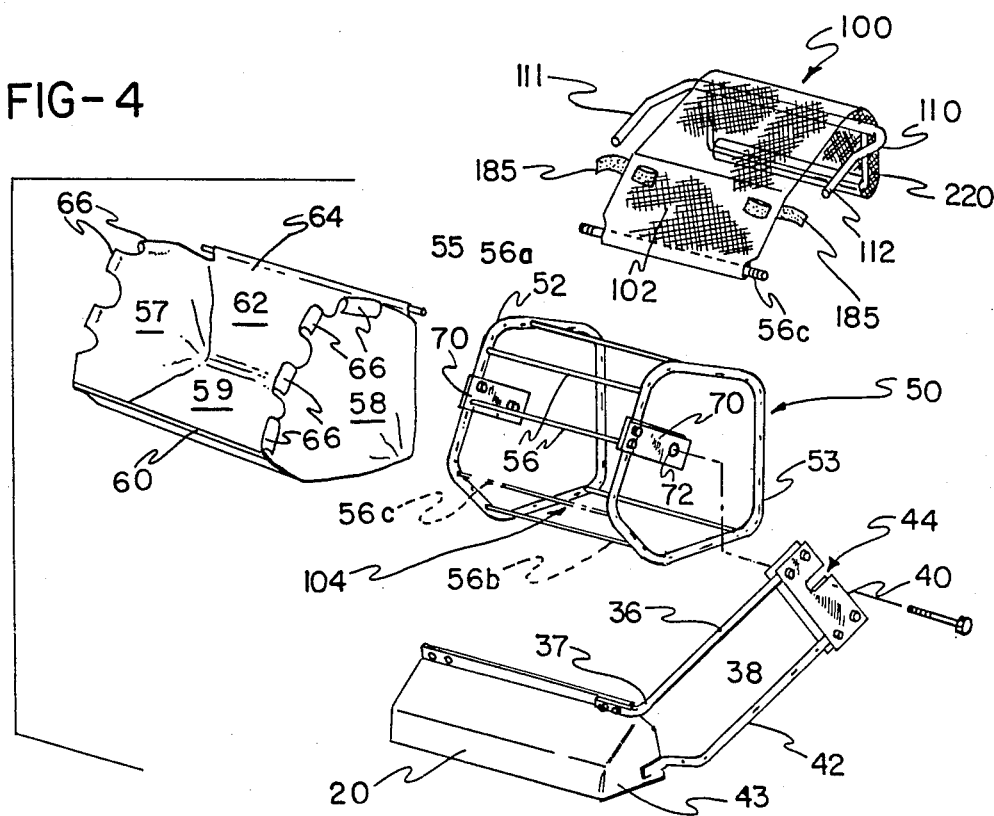
FIG. 4 is a perspective view of a portion of the hamper support frame, hamper cage, hamper bag, and wind apron.

The hamper assembly 16 includes a hamper bag support sub-frame or cage 50 which is best illustrated in FIG. 4. The cage 50 has a pair of transversely spaced bag support members. The bag support members 52 and 53 are each formed as identical loops of tubular material, and define respective right and left-hand supports for an open top cloth hamper bag 55. The supports 52 and 53 are spaced apart by a plurality of cross members in the form of rods 56 extending between the members 52 and 53. The spacing between the hamper support members, as defined by the rods 56, is less than the spacing between the load-carrying side frame members 35 and 36, so that the assembled hamper bag and support frame may be comfortably received between the respective support frames.

The hamper bag 55, as best shown in FIG. 4, is formed with a pair of side walls 57 and 58 and an intermediate bottom 59 which extends between the side walls. The bottom 59 terminates, at its forward end, at a forward lip 60 and, at its rear end, terminates at a rear hamper wall 62. The rear wall 62, itself, terminates at an upper dumping lip 64 (FIG. 5), and is supported on one of the cross members 56a. Similarly, the forward lip 60 itself is supported on one of the cross members 56b (FIG. 4).

The side walls 57 and 58 are provided with a plurality of sewn or enclosed loops 66 which are threaded on and received over the tubular cage members 52 and 53.

Figure 3:
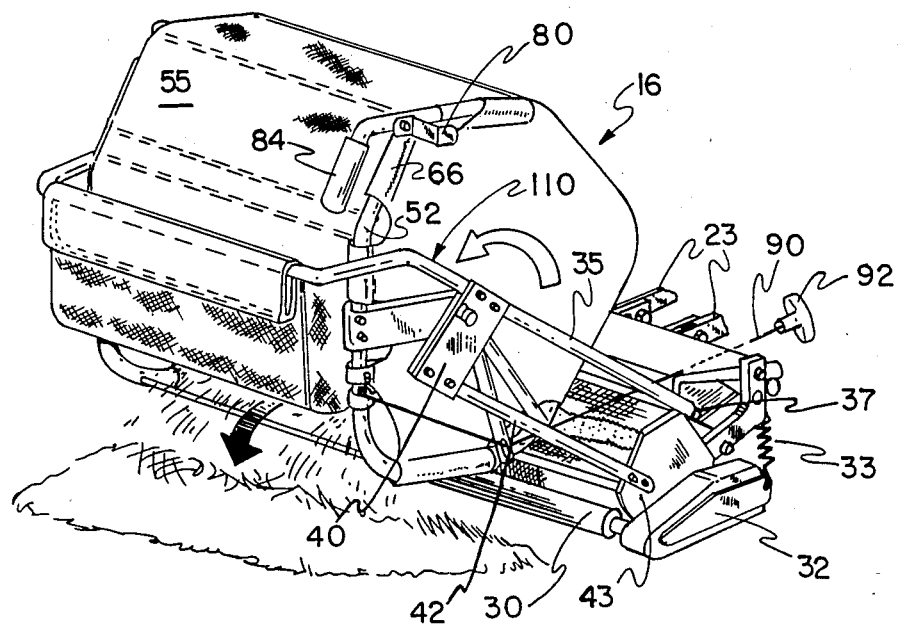
FIG. 3 is a rear perspective view of the lawn sweeper showing the hamper being rotated to the dumping position.

Each of the cage frame members is provided with an inwardly extending support plate 70 carrying an outwardly-extending pin 72. The plates 70 form means, on the cage which rotatably mounts the cage about a transverse axis on the support frame bearing plate 40, For this purpose, the bearing plate 40 is provided with an upwardly and rearwardly inclined notch 75 for receiving the extended end of one of the pins 72. The location of the pins 72 is diagrammed in FIGS. 6 and 7 and illustrates the fact that the pins are rearwardly of the center of gravity of the hamper, when the hamper is loaded with debris, so that the hamper tends to remain at its forward or normal loading position as shown at FIGS. 1 and 2. Pairs of clips 80 on the hamper cage members come into engagement with one of the hamper support frame members when the hamper is in its forward or normal running position, as shown in FIG. 2 to support the assembly 16. The clip 80, on the right-hand side, is associated with a lifting handle 84 (FIG. 2) by means of which the hamper may be manually elevated or raised to the rear dumping position, as shown in FIG. 3.

The hamper may also be dumped by means of a pull cable 90 on the right-hand side thereof as viewed in FIG. 2, from a position on the tractor, by pulling on a pull handle 92 on the end of the cable. Cable 90 is threaded and attached to a pair of stretcher arms 93 and 94, which arms are pivoted for limited rotational movement on the adjacent hinge pate 40, with the rear end of the cable 90 attached to the cage frame member 52 by a securing pin 95. The cable stretching arms 93 and 94 for this purpose are identical in function to the corresponding arms 33 and 34 of the above-identified patent of Ruhl, U.S. Pat. No. 3,597,783, the disclosure of which is incorporated herein by reference. The arms 93 and 94 progressively transfer the movement of the pull cable 90, to keep the cable in substantial alignment with the direction of rotation of the hamper assembly 16 within the frame, to provide an improved mechanical advantage to the cable 90 in effecting dumping rotation of the hamper assembly 16.

The open top of the bag 55 is enclosed by a wind apron assembly 100 as illustrated in the exploded view of FIG. 4. The wind apron assembly 100 includes a flexible open mesh or open fabric wind apron 102, the width of which corresponds generally to the spacing between the side walls 57 and 58 of the bag 55. The wind apron 102 has a forward end threaded over a cross rod 56c which attaches between the frame members 52 and 53 of the cage 50 as illustrated at the phantom view of the rod 56c in FIG. 4. Thus, the forward end defines between the rods 56c at the lip 60 and 56b a opening or open space 104 (FIG. 4) through which material is directed into the interior of the hamper over the forward lip 60.

The rear portion of the screen 102 is carried on a generally U-shaped frame cross member 110. The frame member 110 has forwardly extending arms 111 and 112 which mate with the members 35 and 36 at the hinge plates 40 and, in effect, form rearward extensions of the frame members. The rear frame member 110 supports a downwardly-extending, generally U-shaped wind apron support 120. The rear end of the wind apron 100 is passed over the horizontal portion of the cross member 110 and sewn to the parallel support 120 as illustrated at 125 in FIG. 5. The wind apron is then carried over the transverse end frame member 110 and forwardly to the rod 56c.

Figure 7:
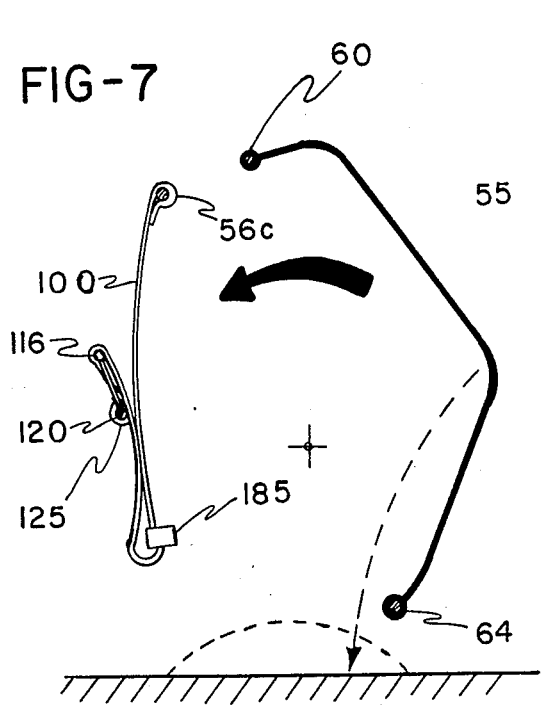
FIG. 7 is a view similar to FIG. 6 showing the parts during dumping.
Figure 5:
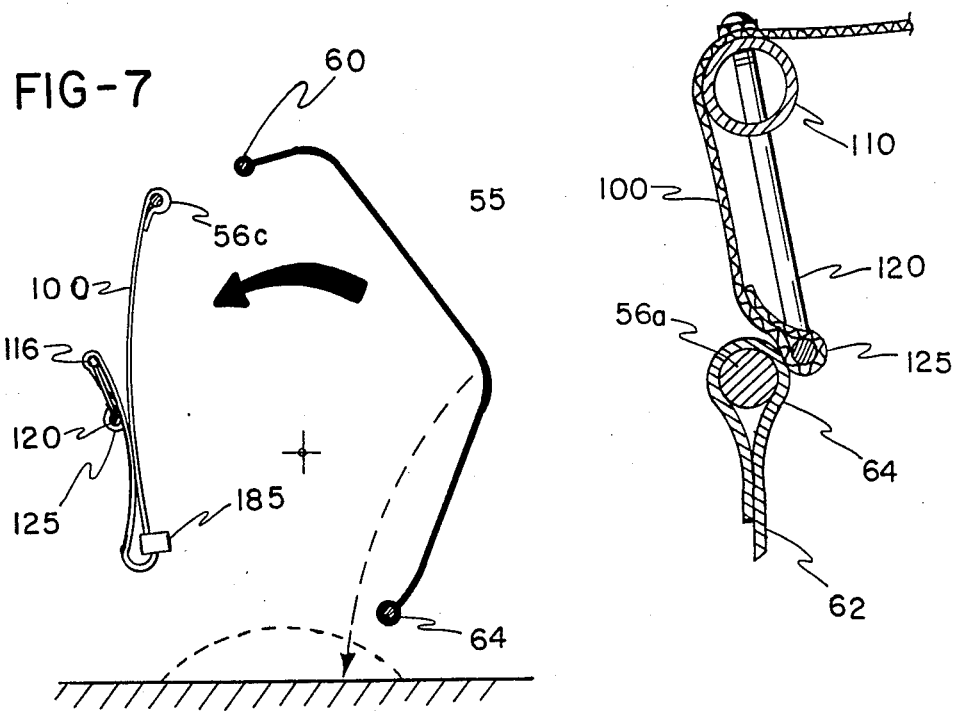
FIG. 5 is an enlarged vertical fragmentary section through the wind apron and rear frame support, showing the relation of the wind apron support to the rear hamper lip in the normal or operative position of the hamper.

The lower of terminal portion of the wind apron 100, at the cross member 125, forms a closure with rear bag lip 64 on the cross rod 56a, as illustrated in FIG. 5. The wind apron 100 folds during the rotation of the cage and hamper assembly 16 to uncover and expose the rear lip 64 of the back wall 62 of the bag for the discharge of clippings in the bag. This condition is illustrated in FIGS. 3 and 7.

Means for applying power from a PTO drive to the brush is illustrated in FIG. 8. The PTO drive may take the form of a drive pulley 150 at the rear of the tractor, under the operator's seat. The pulley 150 drives a continuous V-belt 152 about an accurately movable clutch 165. The clutch pulley 165 is mounted on a radius arm 166 for pivotal movement in the direction of the arrow 170 for either tightening or loosening the belt. Belt 152 next passes over a first guide pulley 162 to the brush drive pulley 160. The return run of the belt is guided over a second guide pulley 155 and over an idler pulley 154 mounted on top of main housing or frame 20. The arm 166 may be connected to a suitable linkage or leverage, not shown, operable from the tractor seat for tensioning or relaxing the belt 152, for the purpose of engaging or disengaging the brush 15, as driven by the brush pulley 160.

The operation of the invention is believed to be largely self-evident from the foregoing description. The hamper assembly 16 assumes its normal position as shown at FIGS. 1 and 2 for its debris or grass clipping operation, behind the tractor 12. The height of the roller 30 is preferably adjusted so that the tips of the rotating brush 15 just grazes or brushes the cut tops of the grass. When the clutch lever 166 is rotated to engage the clutch pulley 165, the brush turns in the direction of the arrow 24 of FIG. 2, to propel cut grass out of the housing 20 and into the bag 55 of the hamper assembly 60 through the opening 104 defined between the forward lip 60 of the bag 55 and the forward attachment or support rod 56c for the wind apron 100.

The wind apron 100 is preferably made of a fairly open mesh flexible screening or fabric material which allows the movement of air therethrough while preventing the lawn debris from being expelled out of the hamper by the energy imparted by the brush 15. Any material which hits the apron will fall back into the hamper and be accumulated therein.

Figure 6:
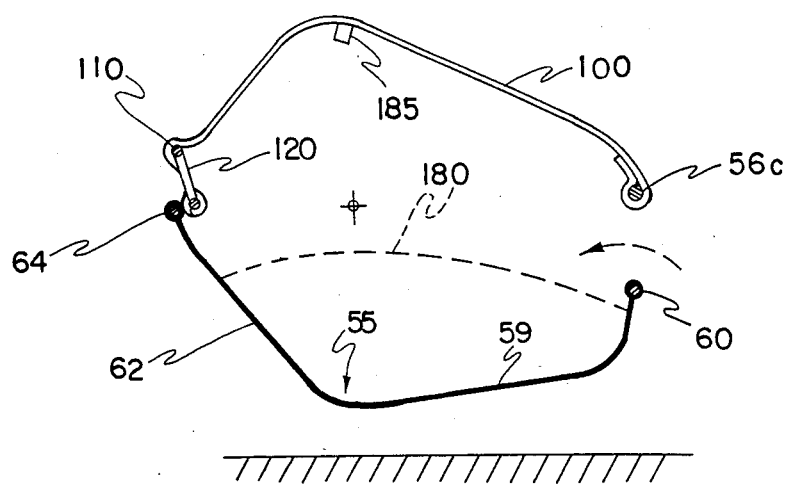
FIG. 6 is a diagrammatic view of the hamper and attached wind apron in the normal operative position.

The weight of the collected debris is generally forward of the center of rotation defined by the pin 72, as shown for example in FIG. 6, the broken line 180 representing the level of the debris. Therefore, the weight of the material is transferred from the hamper assembly to the main frame 20 by the side frame members 35 and 36, and is then transferred by the roller support arms 32 to the ground-engaging transverse roller 30. The roller 30 causes the grass to lay generally in the direction of travel of the tractor 12 and thus, when a lawn or estate is cut in a pattern, a desired striping effect may be obtained.

When the hamper bag is full or substantially full, it may be readily dumped at a desired disposal location by releasing the latches 80 and by pulling on the handle 92 and the cable 90. This causes the hamper assembly 16 to rotate counterclockwise as viewed in FIGS. 2 and 3. As the hamper assembly rotates, under the influence of a pull on the cable 90 as transmitted to the post 95 by the arms 93 and 94, the rearward lip 64 of the bag 55 moves down and away from the lower terminal end 125 of the wind apron, thereby causing a rear dumping opening to form. This is accompanied by a folding movement of the apron as shown in FIGS. 3 and 7. The back wall 62 of the bag 65 may be rotated through approximately 120° from its normal operating position and elevated with respect to the rear lip 64, permitting the material in the hamper bag to fall by gravity through the opening. In the event that the hamper assembly is filled with very heavy material, such as wet clippings, the hand grip 84 may be utilized to rotate the hamper assembly.

After the hamper has been emptied of its contents, as described above, it may be returned to the normal operating position, and the tractor and attached brush-type lawn sweeper driven away from the debris pile.

The returning of the hamper assembly to its normal operating position of FIGS. 1 and 2 automatically closes the opening formed between the wind apron and the rear of the hamper, and the apron is brought again at its rest position closing the open top of the hamper assembly. The extent of roll-back of the wind apron with respect to the hamper may be controlled by attaching a forward portion of the apron to one or the other side frames 52 or 53 of the carriage by a pair of "Velcro" brand attaching straps 185 (FIG. 4).

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a powered lawn sweeper having a rear-dumping hamper in which lawn debris such as grass clippings are collected, and in which an open top hamper is mounted on a hamper support frame for movement between a normal position for collecting such lawn debris therein from the sweeper, and a rear-dumping position in which the hamper is rotated on the frame such that a back wall of the hamper is lowered with respect to the floor of the hamper while the floor thereof is elevated, the improvement comprising:

a wind apron proportioned normally to cover the open top of the hamper,
    said wind apron being formed of a foldable open mesh material,
    said wind apron having a forward end,
    means attaching said wind apron forward end to a forward portion of said hamper,
    means supporting said wind apron in relatively closing relation to said hamper open top in the normal position of the hamper,
    said hamper support frame having a transverse wind apron support member,
    said support member being positioned closely adjacent the hamper back wall in said normal position thereof,
    means attaching a rear portion of said wind apron to said transverse support member such that said hamper top is closed by said wind apron in said normal position, and
    said back wall being movable away from said support member during rotation of said hamper to said dumping position to expose the contents of said hamper for rear dumping, accompanied by folding of said wind apron about said support member.

2. An improved power-driven rotating brush-type lawn sweeper for use as an attachment to the rear of a lawn tractor and having a hamper with rear dumping capability, comprising, a lawn-tractor driven lawn sweeper brush assembly including a brush supporting housing, roller means on a rearward portion of said housing supporting said housing for transport across a lawn, hitch means on a forward portion of said housing providing for attachment to a lawn tractor, a sweeper brush rotatably received in said housing for engaging lawn clippings on a lawn and directing the same rearwardly thereof, power means connected to said brush for rotating said brush, a hamper support frame mounted on said housing including a pair of transversely spaced-apart load carrying side members, said members having forward ends and rear ends, a transversely extending rear member joining said side members at said rear ends thereof, said forward ends of each of said side members connected to and supported on said brush housing for transferring the load of a hamper supported on said frame to said roller means through said brush housing, bearing means at said rear ends for rotatably supporting a hamper in the space between said side frame members, a hamper including a hamper bag support cage, said cage having a pair of transversely spaced bag support members, a plurality of cross members extending between said support members and defining said spacing therebetween as less than the spacing between said loadcarrying side members of said support frame, means on said cage rotatably mounting said cage about a transverse axis on said support frame bearing means, a hamper bag mounted on said cage, said bag having a pair of side walls mounted respectively on said cage bag support members, a bottom extending between said side walls, and having an open top, said bottom terminating at a forward lip in the front and at a rear wall at the back, said forward lip including one of said cross members and said rear wall terminating at a dumping lip including another of said cross members, said bag support cage movable about said axis on said support frame to carry said bag between a normal operative loading position and a rear dumping position in which said front lip is elevated and said rear dumping lip is lowered with the bag bottom therebetween sloping so as to discharge clippings over said rear lip, and a wind apron having a rear end terminated at said rear frame member and a forward end, said forward end supported on said cage at one of said cross members in spaced relation to said bag forward lip defining therebetween an inlet opening for clippings from said brush, said rear end forming a closure with said rear bag lip in said normal operative position of said cage, the transverse width of said apron being sufficient to cover said bag open top in said loading position, said apron being foldable during rotation of said cage to said dumping position to uncover said top and expose said rear lip for discharge of clippings in said bag.

3. An improved power-driven rotating brush-type lawn sweeper for use as an attachment to the rear of a lawn tractor and having a hamper with rear dumping capability, comprising, a lawn-tractor driven lawn sweeper brush attachment including a brush housing, means supporting said housing for transport across a lawn, means on a forward portion of said housing providing for attachment to a lawn tractor, a sweeper brush rotatably received in said housing for engaging lawn clippings on a lawn and directing the same rearwardly thereof, power means connected to said brush for rotating said brush, a hamper support frame mounted on said housing including a pair of transversely spaced-apart load carrying side members, said members having forward ends and rear ends, a transversely extending rear member joining said side members at said rear ends thereof, the said forward ends of each of said side members connected to and supported on said brush housing for transferring the load of a hamper supported on said frame to said roller means through said brush housing, bearing means on said side frame members for rotatably supporting a hamper in the space between said side frame members, a hamper including a hamper bag support subframe, said sub-frame having a pair of transversely spaced bag support members between said side frame members, means on said sub-frame rotatably mounting said sub-frame about a transverse axis on said support frame bearing means, an open top hamper bag mounted on said subframe, said bag including a pair of side walls, a bottom extending between said side walls, and having a rear wall terminating at a transverse dumping lip, said bag support sub-frame movable about said axis on said support frame to carry said bag between a normal operative loading position and a rear dumping position in which said dumping lip is lowered with the bag bottom therebetween sloping so as to discharge clippings over said lip, and a wind apron having a rear end terminated at said rear frame member and a forward end, said forward end supported on said sub-frame defining with said bag an inlet opening for clippings from said brush, said rear end forming a closure with said rear bag lip in said normal operative position of said sub-frame, the transverse width of said screen being sufficient to cover said bag open top in said normal operative position, said screen being foldable during rotation of said sub-frame to said dumping position to uncover said top and expose said rear lip for discharge of clippings in said bag.

* * * * *